June 20, 1944.  R. O. HURST  2,351,969

PROTECTIVE DEVICE FOR ELECTRICAL APPARATUS

Filed Oct. 24, 1942

WITNESSES:
Edward Michaels

INVENTOR
Robert O. Hurst.
BY
Ezra W. Savage
ATTORNEY

Patented June 20, 1944

2,351,969

UNITED STATES PATENT OFFICE 2,351,969

PROTECTIVE DEVICE FOR ELECTRICAL APPARATUS

Robert O. Hurst, Sharon, Pa., assignor to Westinghouse Electric & Manufacturing Company, East Pittsburgh, Pa., a corporation of Pennsylvania Application October 24, 1942, Serial No. 463,242

4 Claims. (Cl. 200—117)

The invention relates, generally, to protective devices for electrical apparatus and, more particularly, to protective devices utilizing fusible conductors for the interruption of electrical circuits.

The object of the invention is to utilize the voltage generated across a portion of a fusible conductor in a protective device to operate control apparatus to cooperate with the protective device in effecting a circuit interrupting operation.

It is also an object of the invention to provide for making contact with a fusible conductor of a protective device in order to make available for operating control switches a voltage generated across a portion of the fusible conductor.

The invention, accordingly, is disclosed in the embodiment thereof shown in the accompanying drawing, and comprises the features of construction, combination of elements and arrangement of parts which will be exemplified in the construction hereinafter set forth and the scope of the application of which will be indicated in the claims.

For a fuller understanding of the nature and objects of the invention, reference should be had to the following detailed description taken in connection with the accompanying drawing, in which.

Figure 1:
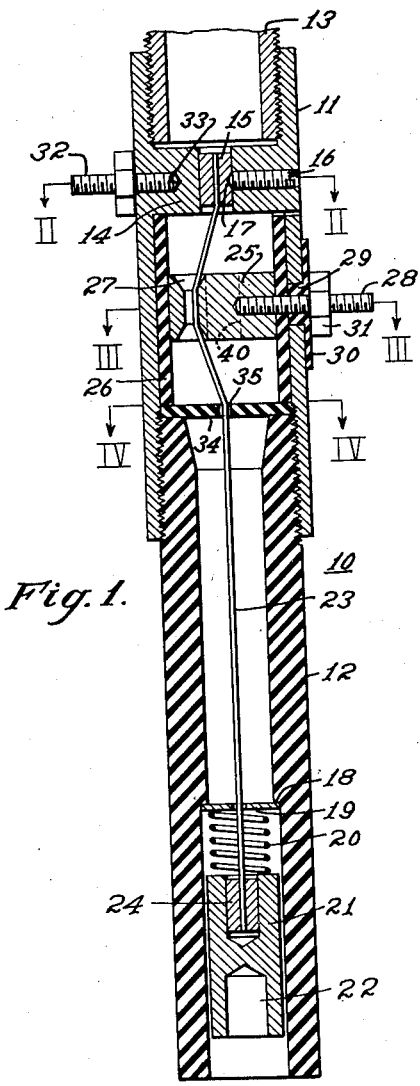
Figure 1 is a view in section of a protective device constructed in accordance with the invention.
Figure 2:
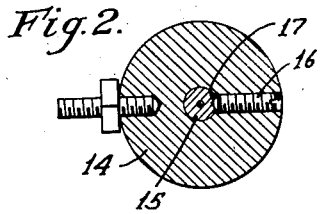
Fig. 2 is a view in cross-section taken along the line II—II of Fig. 1.
Figure 3:
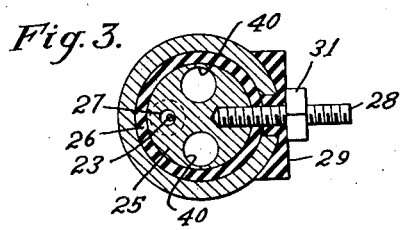
Fig. 3 is a view in cross-section taken along the line III—III of Fig. 1.
Figure 4:
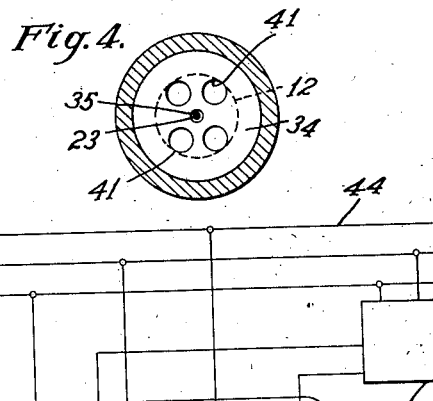
Fig. 4 is a view in cross-section taken along the line IV—IV of Fig. 1.

Referring now to the drawing, and Fig. 1 in particular, the protective device or link illustrated comprises a case shown generally at 10. This case comprises an upper section 11 made from some suitable metal, such as iron, and a lower section 12 made from a suitable insulating material, such as fiber. The case 10 illustrated is tubular in shape but it will be readily appreciated that other shapes may be employed. The diameter of the tubular case will depend on the operating conditions to be met. Anyone skilled in the art, knowing the operating conditions, can readily arrive at the size of the case that will be required.

In order to provide for connecting the protective device in circuit relation with the electrical apparatus to be protected, a terminal member 13 is provided. In this particular embodiment of the invention, the terminal member 13 is a sleeve for receiving the lead of the transformer or the like. As illustrated, the lower end of the terminal member 13 is threaded to engage in an internal thread provided in the upper end of the case section 11. The terminal member 13 will be made from some suitable metal such as copper or brass. Since the terminal member 13 makes threaded engagement with the upper end of the case section 11, this gives a good electrical contact between them.

The case section 11 is also provided with an inwardly extending member 14 simulating an annular plate in shape. The annular member 14 is thick compared with the thickness of the wall of section 11, thereby presenting a cylindrical opening for receiving a terminal sleeve 15, the purpose of which will appear hereinafter. The sleeve 15 is retained in position in the annular member 14 by means of a setscrew 16 which engages in a depression 17 provided therein.

The insulating section 12 of the case 10 is so constructed that the lower portion has a somewhat greater internal diameter than the upper portion, thus providing a shoulder 18. A washer 19 is seated on this shoulder and receives a biasing spring 20. Below the biasing spring is a projectile 21, the function of which will be described hereinafter. This projectile 21 serves as the lower terminal member and is provided with an opening 22 for receiving a lead or conductor to facilitate the connections of the protective device in an electrical circuit.

The fusible conductor 23 provided for protecting the electrical apparatus is connected between the sleeve 15 and the projectile 21. In connecting the upper end of the fusible conductor to the sleeve 15, it is fitted into an opening provided in the sleeve and soldered thereto in a manner well known in the art. The lower end of the fusible conductor 23 extends into an opening provided in a sleeve 24 fitted into the projectile 21. The fusible conductor will be connected to the sleeve 24 in the same manner that it was connected in the sleeve 15.

It will be readily appreciated that the fusible conductor may be made of such a length that the biasing spring 20 will hold it taut, so that it will not engage the walls of the case 10. The size of the fusible conductor will depend on the operating conditions to be met. The method of selecting a fusible conductor is well explained in the Hodnette Patent No. 2,223,726, issued December 3, 1940.

In this particular protective link, when predetermined conditions develop, it is desired to effect a prompt fusing of the fusible conductor 23. For example, when the protective link is connected between electrical apparatus supplied from a power source having a high voltage and a vast store of energy, it is desirable to provide for effecting the fusing of the fusible conductor by an auxiliary means rather than permitting the high voltage source to arc to ground. In order to bring auxiliary means for fusing the fusible conductor into operation, provision is made for making electrical connections with the fusible conductor to get a voltage source for operating auxiliary apparatus for causing an increased current flow in the fusible conductor.

In order to get a voltage source from the fusible conductor, means is provided for making electrical connection with the fusible conductor at a point intermediate its ends. As illustrated, a contact member 25 is disposed in the upper portion of the case 10. This contact member comprises a block of suitable conducting material such as copper disposed in the upper section 11 of the case 10 and insulated therefrom by a sleeve 26 made from fiber or other suitable insulating material. As illustrated, the contact member 25 has an opening 27 therethrough which simulates the shape of the well known hourglass.

As shown, a binding post 28 extends through an opening provided in the upper section 11 and makes threaded engagement with the contact member 25. This binding post is insulated from the upper section of the case 11 by means of a washer 29. A second washer is fitted over the binding post and rests against the metallic member 11 and is held in place by means of a nut 31 that may be utilized in connecting a conductor to the contact member 25. A second binding post 32 is mounted in a tapped opening 33 provided in the metallic section 11 and which extends into the annular member 14. Since the metallic sleeve 15 is in tight engagement with the annular member 14, the binding post 32 has good electrical connection with the fusible conductor 23.

The case 10 is divided into two chambers by means of a disk 34 made from a suitable insulating material such as fiber. This disk is provided with a central opening 35 through which the fusible conductor 23 extends. The opening 35 is made large enough to permit gas to escape from the upper chamber to the lower chamber.

As will be observed, the opening 27 provided in the contact member 25 is offset from the center. The fusible conductor which extends through the opening 27 and which is held taut does not extend in a straight line between the terminal sleeves 15 and 24. Therefore, the fusible conductor is held in engagement with the contact member 25.

Figure 6:
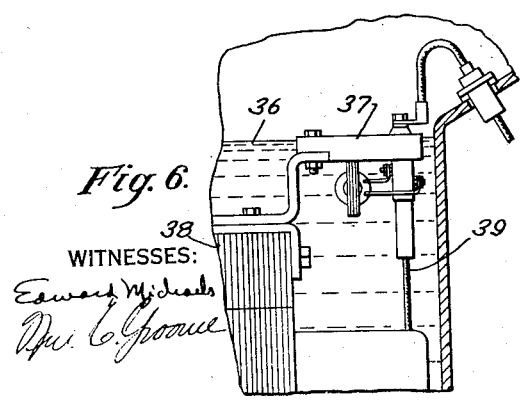
Fig. 6 is a view, partly in section and partly in side elevation, showing how the protective device may be mounted in a transformer.

In operation, the protective link illustrated will usually be immersed in a dielectric 36 shown in Fig. 6. In this particular application of the fusible conductor, it is supported on a bracket 37 mounted on the core iron 38. In applying the fusible conductor to transformers, this is a convenient method for mounting it. The lead 39 from the high tension coil of the transformer may be connected to the projectile 21 which constitutes the lower terminal of the protective device. The lead from the transformer will be connected to the upper terminal 13 and in turn to the sleeve 15 to the upper end of the fusible conductor 23.

In operation, when arcing occurs, the portion of the fusible conductor in the upper chamber will fuse and an arc will be established from the sleeve 15 to the contact member 25. When this arcing occurs, a voltage will be generated across the arc. Therefore, there will be a potential difference between the binding posts 32 and 28. The auxiliary circuit across which the voltage is developed extends from binding post 32 through the annular member 14, sleeve 15, the arc that has fused the fusible conductor to the contact member 25 to the binding post 28. This voltage, as explained in my copending application Serial No. 463,241, filed October 24, 1942, is sufficient to effect the operation of control apparatus which can be utilized for connecting a portion of the fusible conductor across a local circuit to increase the flow of current thereby to accelerate the fusing operation.

The pressures that will be generated in the upper chamber as a result of the fusing of the fusible conductor 23 are relieved by the flow of gas through the opening 35 in the disk 34. This, together with the fusing of the lower portion of the fusible conductor 23, will result in a high pressure in the lower chamber and the resultant blowing out of the washer 19 and the projectile 21, assuring a prompt separation of the fused sections of the fusible conductor 23 and an interruption of the arc.

In order to facilitate proper circulation of the dielectric liquid 36 and the flow of gases, the contact member 25 may be provided with a plurality of openings 40. The disk 34 employed to divide the case into two chambers may also be provided with a plurality of openings 41 to facilitate the flow of gas evolved in the dielectric.

Figure 5:
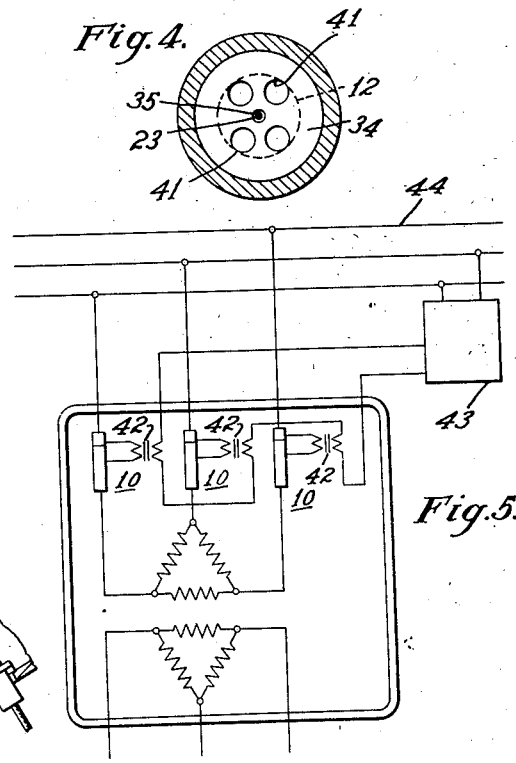
Fig. 5 is a diagrammatic view showing how the protective device may be connected in circuit relation with a three-phase transformer.

The protective link 10 may be used in single-phase circuits or polyphase circuits. In Fig. 5 the protective link is illustrated as connected in a three-phase circuit. As illustrated, the auxiliary transformers 42 are connected across binding posts 32 and 28. Thus, when arcing occurs in any one phase, a voltage is impressed across the lock-in switch 43. When this switch is closed, the transformers 42 are connected across the secondary 44 of the transformer, as shown, or any other suitable source such as a battery which may be available, and a voltage from this power source is imposed across the protective device connected in the other two phases in addition to the voltage in the system in which the electrical apparatus is connected. In this manner, the current flowing in the fusible conductors 23 of the protective links connected in the other phases of the circuit is increased. This accelerates the fusing of the other two protective links and the complete disconnection of the electrical apparatus from the three-phase power system.

The protective links illustrated in Fig. 5 are shown employed with a delta-connected transformer winding, but it will be readily appreciated that they may be employed in protecting any other kind of electrical apparatus. The method of connecting the protective links with other apparatus will be readily appreciated by anyone skilled in the art.

Since certain changes may be made in the above protective device and different embodiments of the invention could be made without departing from the scope thereof, it is intended that all matter contained in the above description or shown in the accompanying drawing shall be interpreted as illustrative and not in a limiting sense.

I claim as my invention:

1. In a protective device for electrical apparatus, a case, terminal members disposed in opposite ends of the case, a partition disposed to divide the case into a plurality of chambers, said partition having an opening therein, a fusible conductor disposed between the terminals, means provided for making electrical contact with said terminal members, a contact member disposed in the case and insulated therefrom, said contact member having an opening therethrough for the fusible conductor, said opening being off-center, and means for imposing a biasing pressure on the lowermost terminal member to keep the fusible conductor taut and in electrical contact with said contact member.

2. In a protective device for electrical apparatus, a tubular case, terminal members disposed in opposite ends of the case, a fusible conductor extending between the terminals and electrically connected with them, a partition extending across the tubular case dividing it into two chambers the partition having a central opening through which the fusible conductor extends, a contact member disposed in the case and insulated therefrom to engage the fusible conductor intermediate its ends, the contact member having an opening which is not concentric with the tubular member, the fusible conductor extending through the opening in the contact member, a spring disposed to bias the lowermost terminal member downwardly thereby to maintain the fusible conductor taut and in electrical engagement with the contact member, and means for making an electrical contact with the terminal members and the contact member whereby electrical connections may be made across a portion of the fusible conductor.

3. In a protective device for electrical apparatus, a tubular case, terminal members provided with means for making electrical connections in a circuit carried by the case, a partition disposed in the case dividing it into a plurality of chambers the partition having an opening extending therethrough, a contact member disposed in the case and insulated therefrom, the contact member and partition having openings therethrough which are not concentric with one another, a fusible conductor disposed between the terminal members and extending through the opening in the contact member and partition, and a spring disposed to bias one of the terminal members outwardly thereby to keep the fusible conductor taut and in electrical contact with the contact member.

4. In a protective device for electrical apparatus, in combination, a two-section case, the upper section being of a conducting member while the lower section is of non-conducting material, a terminal member disposed in the metallic section of the tubular case, a second terminal member slidably mounted in the lower section of the tubular case, a fusible conductor having predetermined fusing characteristics disposed between the terminal members, a partition dividing the case into two chambers and having an opening therethrough for receiving the conductor, a contact member disposed in the upper chamber of the case and insulated therefrom, the contact member having an opening through which the fusible conductor extends, the openings in the partition and contact member being offset relative to one another, and means for biasing the lower terminal downwardly to keep the fusible conductor taut thereby to hold it in electrical contact with the contact member, and means disposed in the case for making electrical connection with the contact member.

R. O. HURST.